United States Patent

Raghunath

[11] Patent Number: 5,937,007
[45] Date of Patent: Aug. 10, 1999

[54] METHOD FOR PROVIDING TAP LEAKAGE IN ADAPTIVE EQUALIZER SYSTEMS

[75] Inventor: Kalavai Janardhan Raghunath, Chatham, N.J.

[73] Assignee: Lucent Technologies Inc., Murray Hill, N.J.

[21] Appl. No.: 08/841,744

[22] Filed: Apr. 30, 1997

[51] Int. Cl.$^6$ .................................................... H04H 7/30
[52] U.S. Cl. .......................... 375/232; 333/18; 364/724.2
[58] Field of Search ..................... 375/229, 230, 375/232; 364/724.012, 724.16, 724.19, 724.2; 333/18, 166

[56] References Cited

U.S. PATENT DOCUMENTS 4,243,959  1/1981  Duttweiler ............................. 333/166

*Primary Examiner*—Amanda Le

[57] ABSTRACT

A method is described for producing coefficient leakage in an adaptive filter/equalizer without the need for using an adder/subtractor for each coefficient. Specifically, a method is provided for incrementally reducing the magnitude of one or more coefficients in an adaptive filter/equalizer solely through a defined manipulation of certain bits in that coefficient, such bit manipulation being carried out on a periodic basis. The period for such bit manipulation will generally track the frequency of adaptation iteration for such a filter/equalizer.

17 Claims, 2 Drawing Sheets

METHOD FOR PROVIDING TAP LEAKAGE IN ADAPTIVE EQUALIZER SYSTEMS

CROSS REFERENCE TO RELATED APPLICATIONS

This application is related to U.S. patent application Ser. No. 08/841,749, entitled "ROBUST METHOD FOR PROVIDING TAP LEAKAGE IN ADAPTIVE EQUALIZER SYSTEMS", (RAGHUNATH-10), now abandoned, said related application being concurrently filed with the present application and being incorporated herein by reference.

BACKGROUND OF THE INVENTION

A. Field of the Invention

This application is related to the art of digital signal processing and more particularly to methods for providing tap leakage in adaptive equalizer systems.

B. Background Art

It has become commonplace to transmit a wide variety of information across a transmission medium as a digital signal—i.e., a signal for which both time and amplitude are discrete, whether that information is inherently represented in an analog or digital form. In the case of information which is originally in an analog form, the continuous analog signal is sampled at predetermined intervals to arrive at a sequence of discrete numbers—each being representative of a value of the continuous signal at that sample point—such numbers being expressed in a numbering system (generally binary) compatible with the digital transmission scheme. After such a "digitizing" procedure, there is no difference from the standpoint of the transmission infrastructure between such analog-originated information and information which originates in a digital form.

Signal processing of information signals transmitted over a channel occurs in a wide variety of applications and with many objectives. Typical reasons for signal processing include: estimation of characteristic signal parameters; elimination or reduction of unwanted interference; and transformation of a signal into a form that is in some manner more useful or informative. Such processing of discrete (or digital) information signals is carried out by Digital Signal Processing ("DSP") techniques. Applications of DSP techniques currently occur in such diverse fields as acoustics, sonar, radar, geophysics, communications and medicine.

Processing elements which operate on a digital signal frequently occur as filters or equalizers, which are typically represented in the form of a tapped delay line, such as illustrated in FIG. 1, where the "T" of each element 10 represents the period of the sampling frequency for a signal of interest. A characteristic of such a tapped delay line is that an output is a function of an input signal (including, in some cases, prior values of that input signal) and coefficients corresponding to the taps. Algebraically, that relationship would generally be of the form:

$$y_n = C_0 + C_1 x_1 + C_2 x_2 + \ldots + C_n x_n$$

where y represents an output signal, x represents an input signal and $C_0, C_1, \ldots C_n$ are representative of the coefficients.

A comparatively recent variation in digital signal processing is known as adaptive signal processing which has developed concurrently with rapid advance in processing power for DSP hardware devices. A significant difference between classical signal processing techniques and the methods of adaptive signal processing is that the latter are generally applied for time varying digital systems. For the adaptive signal processing case of adaptive filtering, a filter (or equalizer) is caused to adapt to changes in signal statistics so that the output is as close as possible to some desired signal. Adaptive filtering will often be applied for the recovery of an input signal after transmission of that signal over a noisy channel.

Various adaptation algorithms are well known in the art and need not be discussed herein. However, it should be observed that the general adaptation process for an adaptive filter or equalizer operates on the tap coefficients of such a filter or equalizer by iteratively adjusting such coefficients until a desired objective is achieved—e.g. a signal to noise ratio above a defined threshold. The general adaptation process can be described algebraically as:

$$C' = C \pm u$$

where C' is the value of coefficient C after an adaptation iteration and u represents an update term added by the adaptation iteration. It should be understood of course that each coefficient in a filter will be updated in this same manner and that the update term u may, and likely will, vary from coefficient to coefficient. In a conventional digital system those coefficients will be expressed as binary numbers.

With adaptive filters and equalizers, it is well known that the coefficients must be reduced by a small quantity (independent of the update term), on a periodic basis—generally coincident with each iteration of the adaptation process—in order to promote stability of the filter or equalizer. This small periodic reduction in the magnitude of a coefficient is known as "leakage". Without such leakage, some of the coefficients will tend to become too large—primarily due to the effect of truncation of some less significant bits of a coefficient due to use of finite length registers (e.g., 24 bit, 32 bit, etc.) in the computer or DSP hardware used to carry out the processing—which can lead to instability in the system.

In the prior art, leakage is accomplished by providing an adder/subtractor for each coefficient, programmed to subtract a defined small quantity from the coefficient at each cycle of the leakage period. It is, however, common for adaptive filters and equalizers to contain several hundred tap coefficients, and thus a corresponding number of adder/subtractors must be added to the filter system to provide for the required leakage at each coefficient. It is easy to see that this significantly increases the complexity of the filter system.

SUMMARY OF INVENTION

It is accordingly an object of the invention to provide a method for accomplishing leakage for coefficients of an adaptive filter/equalizer which does not rely on the use of an adder/subtractor for each coefficient. To that end, a method is provided for incrementally reducing the magnitude of one or more coefficients in an adaptive filter/equalizer solely through a defined manipulation of certain bits of that coefficient, such bit manipulation being carried out on a periodic basis where such period generally tracks the frequency of adaptation iteration for such a filter/equalizer.

DETAILED DESCRIPTION OF INVENTION

Figure 1:
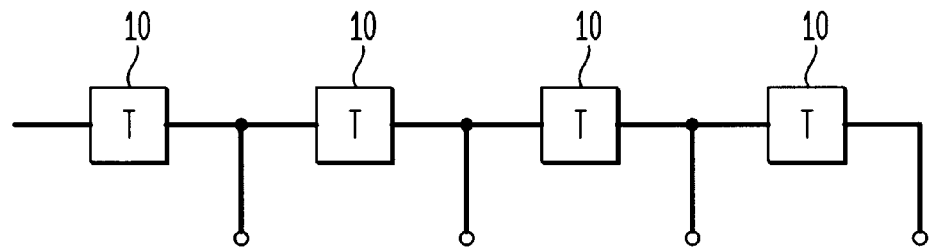
FIG. 1 illustrates in schematic form a tapped delay line as being representative of the form of digital filters/equalizers.

The discussion following will be presented partly in terms of algorithms and symbolic representations of operations on data bits within a computer system. As will be understood, these algorithmic descriptions and representations are a means ordinarily used by those skilled in the computer processing arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

It is well known in the art of digital signal processing that adaptive filters and adaptive equalizers are functionally equivalent. In an illustrative case, a transmission line may be modeled as an adaptive filter having a given set of filter coefficients, and a signal passing through that channel can be equalized by passing it through another adaptive filter (or equalizer) with coefficients adjusted so that they approximate an inverse filter to the channel filter. For convenience, the method of the invention will generally be described herein in terms of operation on the coefficients of an "equalizer". It should be understood, however, that the term "equalizer" is used herein to characterize any digital device having a staged operation on an input signal and coefficients corresponding to the action of each such stage, and that the methodology of the invention applies to any such device, whether characterized as an equalizer, a filter, a tapped delay line, an echo canceler, or the like.

It is also well known that the processing of digital signal data is commonly carried out using data represented in the binary number system (base 2) using positional notation. Additionally, because of difficulties in machine processing of negative numbers in traditional sign and magnitude format, it has become the norm to use complements of such numbers along with an additional bit (usually in the most significant bit position) indicative of the sign of the number in question. And, the two's-complement representational form is generally preferred over the one's-complement form. Such binary, two's-complement representation will be used in the discussion following to illustrate the methodology of the invention, and may be considered a part of the preferred embodiment of the invention.

As explained in the Background section, in order to maintain stability in an adaptive equalizer, each of the tap coefficients of the equalizer must be periodically reduced by a small increment, a process referred to as "leakage". According to the method of the invention, that leakage may be realized by a probabilistic manipulation of the bits of a given coefficient, thus eliminating the adder/subtractor which must be added for each coefficient in order to provide leakage by the method of the prior art.

According to the method of the invention, the coefficient leakage needed to maintain equalizer stability is provided by setting the least significant bit (LSB) of a coefficient equal to the most significant bit (MSB) of that coefficient at successive iterations of the adaptation process. Note that in most contemporary digital signal processing applications, the representation of numerical values includes a bit at the MSB position indicative of the sign of the number represented—the usual convention being "0" for a positive number and "1" for a negative number. Thus, in those circumstances, the method of the invention can also be characterized as setting the LSB of a coefficient equal to the sign bit of that coefficient.

Figure 2A:
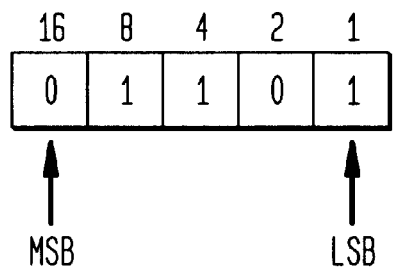
FIG. 2 depicts an application of the method of the invention for providing leakage for a positive equalizer coefficient.
Figure 2B:
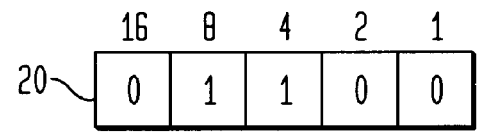

The bit manipulation leakage process of the invention can be illustrated by reference to the sample coefficient shown in FIG. 2, where the binary representation of the coefficient before applying the bit-manipulation leakage process is shown at (A) and the corresponding representation of the coefficient after the LSB has been set equal to the MSB, according to that process, is shown at (B). The binary values are shown at each bit position in registers 20 of FIGS. 2A and 2B, and the decimal value of each bit position shown above that position in its register. As can be seen, this transformation according to the method of the invention results in a reduction in the magnitude of the sample coefficient from decimal 13 to decimal 12. It will of course be understood that the 5-bit sample coefficient is chosen for convenience of illustration and that in practice such coefficients are likely to be represented by significantly greater bit lengths.

Figure 3A:
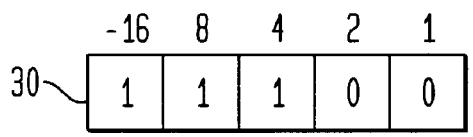
FIG. 3 depicts an application of the method of the invention for providing leakage for a negative equalizer coefficient.
Figure 3B:
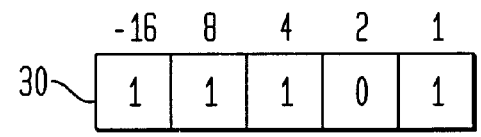

Application of the method of this embodiment to negative numbers is illustrated in FIG. 3. The binary (two's complement) representation of the coefficient before applying the bit-manipulation leakage process is shown in register 30 of FIG. 3A and the corresponding representation after setting the LSB equal to the MSB is shown in register 30 of FIG. 3B. As can be seen the operation of the process of the invention reduces the magnitude of this sample coefficient from decimal −4 to decimal −3. It is to be noted that, while two's-complement coefficient representation is used here to illustrate the application of the method of the invention to negative coefficients, it will be apparent to those skilled in the art of the invention that this methodology can readily be extended to other means for representing negative numbers.

Figure 4:
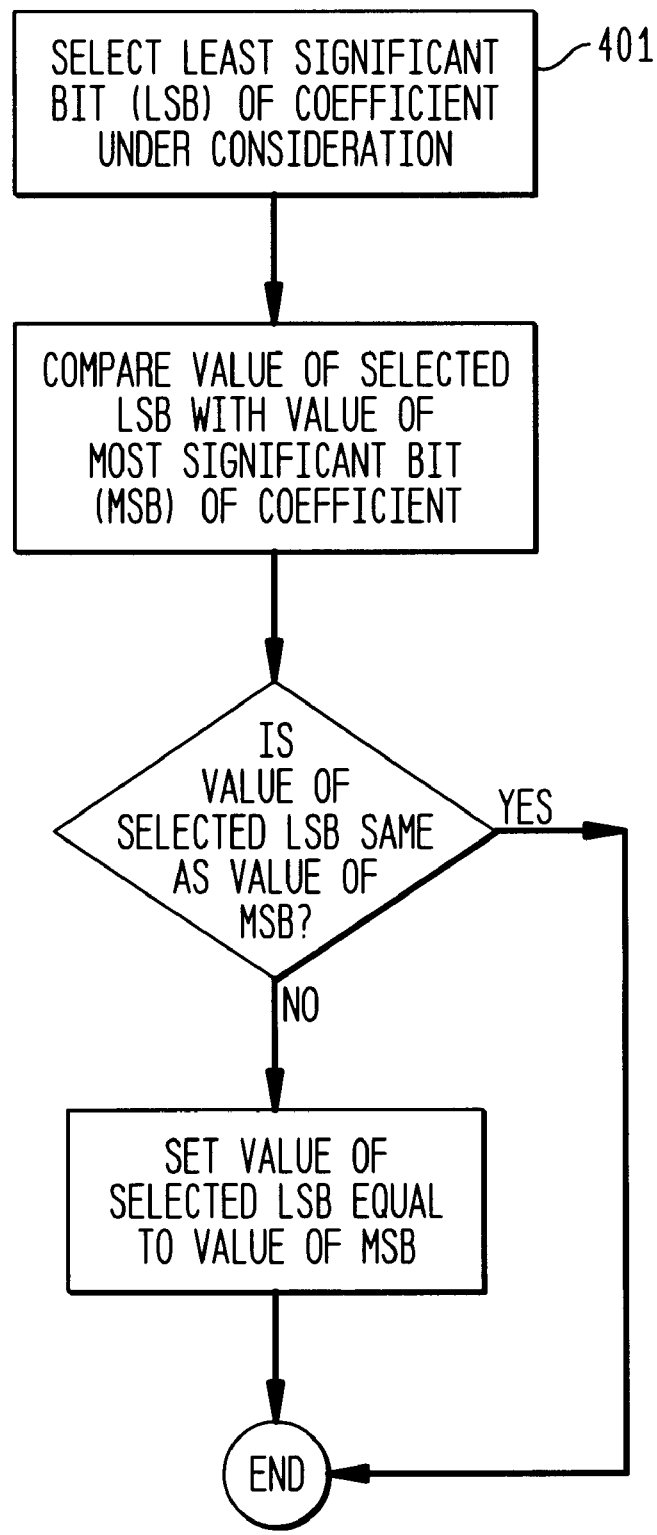
FIG. 4 illustrates the methodology of the invention in flow chart form.

The methodology of the invention is illustrated in flow chart form in FIG. 4. As shown in the figure, the method begins with the selection of the least significant bit (or, for an alternative embodiment described below, a sequentially higher-order bit position) for a coefficient under consideration—step 401. The value of that selected bit is then compared with the value of the most significant bit for the coefficient—step 402. In a decision step 403, a determination is made as to whether the value of the selected bit and the compared most significant bit are the same. If they are not, the process continues to step 404, where the value of the selected bit is set equal to the value of the most significant bit. If the values are found to be the same at step 403, the process ends.

For the described methodology of setting the LSB of the coefficient equal to the MSB, it will be apparent that the case of the MSB and LSB having the same magnitude for a given coefficient would result in no change in the value of the coefficient for that adaptation iteration, and thus no leakage would occur for that coefficient at that iteration. It will, however, be readily seen that, in a binary system (where each bit position will have one of two values—"0" or "1"), the probability of the MSB and LSB of a coefficient having the same value would be fifty percent; thus leakage would occur for a given coefficient, on average, once every two cycles of the adaptation process. The inventor has established empirically that such an alternate iteration regime of leakage, at the leakage levels provided by the method of the invention, is adequate to maintain the coefficients within a magnitude required to assure stability of the adaptive equalizer.

It should also be apparent that stronger leakage for a given coefficient may be obtained by setting the bit value of a higher bit position (e.g., the second bit position from the right in the registers illustrated in FIGS. 2 and 3) equal to the MSB of that coefficient, thus reducing the original coefficient magnitude by a greater amount than would have occurred from such an operation at the LSB position. Any such operation of setting a lower level bit value equal to the MSB value to provide coefficient leakage is intended to be encompassed by the method of the invention.

CONCLUSION

A probabilistic bit-manipulation methodology for achieving coefficient leakage in adaptive equalizers has been disclosed and described. With the methodology of the invention, such coefficient leakage can be achieved without the use of a separate adder/subtractor for each coefficient in such an equalizer, as must be done in the prior art. The method of the invention for providing coefficient leakage will be applicable for any adaptive equalizer. Applications of the invention include HDTV demodulation, multimedia digital services, hybrid fiber cable services, cable broadcast modems, PC cable modems, and the like.

Although the present embodiment of the invention has been described in detail, it should be understood that various changes, alterations and substitutions can be made therein without departing from the spirit and scope of the invention as defined by the appended claims.

I claim:

1. A method for providing leakage for a coefficient of an adaptive equalizer, said coefficient being expressed as a sequence of bits, said method comprising the steps of:
    selecting at least one of said bits of said coefficients;
    causing a value of said selected bit to be compared to a value of another bit in said coefficient, and
    upon a determination, in said compare step, that said selected bit and said another bit have different values, setting said selected bit value equal to said another bit value.

2. The method for providing leakage of claim 1 wherein said selected bit is a lower order bit of said coefficient and said another bit is a higher-order bit of said coefficient.

3. The method for providing leakage of claim 2 wherein said selected lower order bit of said coefficient is a least significant bit of said coefficient and said another bit is a most significant bit of said coefficient.

4. A processor programmed to carry out the method of claim 1.

5. The processor of claim 4 implemented as a digital signal processor.

6. The processor of claim 4 implemented as a general purpose computer processor.

7. A storage medium configured to include a computer program for carrying out the method of claim 1.

8. A storage medium fabricated to include a set of instructions for carrying out the method of claim 1.

9. A method for incrementally reducing the magnitude of a coefficient of an adaptive equalizer, said coefficient being expressed as a sequence of bits and being subject to a periodic updating according to a known adaptation regime, said method comprising the step of resetting a value of one or more selected bits of said coefficient during each of a statistical subset of a set of said periodic updates of said coefficient.

10. The method for incrementally reducing the magnitude of a coefficient of an adaptive equalizer of claim 9 wherein said step of resetting a value of one or more selected bits of said coefficient includes setting of a selected lower order bit of said coefficient equal to a most significant bit of said coefficient.

11. The method for incrementally reducing the magnitude of a coefficient of an adaptive equalizer of claim 10, wherein said selected lower order bit is a least significant bit of said coefficient.

12. The method for incrementally reducing the magnitude of a coefficient of an adaptive equalizer of claim 9, wherein said step of resetting a value of one or more selected bits of said coefficient includes setting of a selected lower order bit of said coefficient equal to a sign bit of said coefficient.

13. A method for providing leakage for a coefficient of an adaptive equalizer, said coefficient being expressed as a sequence of bits, said method comprising the steps of:
    choosing at least one of said bits of said coefficient for manipulation according to a defined regime, wherein said bit manipulation includes a step of setting a selected lower order bit of said coefficient equal to a most significant bit of said coefficient; and
    effecting said leakage for said coefficient by carrying out said bit manipulation during each of a statistical subset of a set of adaptation intervals for said coefficient.

14. The method for providing leakage of claim 13 wherein said step of setting a selected lower order bit of said coefficient equal to a most significant bit of said coefficient is carried out by setting a least significant bit of said coefficient equal to said most significant bit of said coefficient.

15. A method for incrementally reducing the magnitude of a coefficient of an adaptive equalizer through the step of manipulating certain bits of said coefficient according to a defined protocol, wherein said defined protocol includes setting of a selected lower order bit of said coefficient equal to a most significant bit of said coefficient.

16. The method for incrementally reducing the magnitude of a coefficient of an adaptive equalizer of claim 15, wherein said selected lower order bit is a least significant bit of said coefficient.

17. A method for incrementally reducing the magnitude of a coefficient of an adaptive equalizer through the step of manipulating certain bits of said coefficient according to a defined protocol wherein said defined protocol includes setting of a selected lower order bit of said coefficient equal to a sign bit of said coefficient.

* * * * *